United States Patent Office 3,644,464
Patented Feb. 22, 1972

3,644,464
BIS(ALKENYL)[ETHYLENEBIS(OXYTRIMETHYL-
ENE)]BIS(DITHIOCARBAMATE)
John Joseph D'Amico, Akron, Ohio, assignor to
Monsanto Company, St. Louis, Mo.
No Drawing. Filed Nov. 4, 1968, Ser. No. 773,290
Int. Cl. C07c 155/08
U.S. Cl. 260—455 A                          1 Claim

ABSTRACT OF THE DISCLOSURE

Compounds of the formula

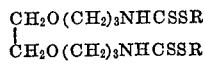

where R is allyl, 2-chloroallyl, or cis- and trans-2,3-dichloroallyl for controlling foliage fungi.

---

The present invention relates to a new and improved class of dithiocarbamates valuable as fungicides. In my prior patent U.S. 3,082,237, Mar. 19, 1963, is described bis(2 - cyclohexenyl)[ethylenebis(oxytrimethylene)]bis(dithiocarbamate) and its use as a soil fungicide. I have now discovered a new and improved class of ethylenebis(oxytrimethylene)bis(dithiocarbamate) fungicides of the formula

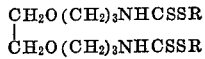

where R represents allyl, 2-chloroallyl, or cis- and trans-2,3-dichloroallyl. The new compounds are especially valuable as foliage protectants. The invention will be fully understood and apparent from the detailed examples which follow.

EXAMPLE 1

To a stirred solution containing 17.6 parts (0.1 mole) of ethylenebisoxypropylamine and 25.2 parts (0.4 mole) of concentrated ammonium hydroxide in 200 ml. of water, at 5° C., was added dropwise at 5°–15° C., 15.2 parts (0.2 mole) of carbon bisulfide. The solution was stirred at 25°–30° C. for an hour whereupon 22.2 parts (0.2 mole) of 2-chloroallyl chloride were added in one portion and stirring continued at 25°–30° C. for 18 hours. The reaction mixture was then extracted with 350 ml. of ethyl ether, the ether solution washed with water until the washings were neutral to litmus, and dried over sodium sulfate. The ether was removed in vacuo at a maximum temperature of 80°–90° C./1–2 mm. The product, bis(2-chloroallyl)[ethylenebis(oxytrimethylene)] bis (dithiocarbamate), was obtained in 98.2% yield as an amber oil. Analysis gave 5.85% nitrogen compared to 5.87% calculated for $C_{16}H_{26}Cl_2N_2O_2S_4$.

Employing substantially the same reaction conditions and replacing the 2-chloroallyl chloride with an equimolar amount respectively, of allyl chloride and cis- and trans-1,2,3-trichloropropene, respectively, further examples were prepared as follows:

EXAMPLE 2

Diallyl[ethylenebis(oxytrimethylene)] bis (dithiocarbamate) as a viscous amber oil in 97.9% yield. Analysis gave 6.78% nitrogen and 31.96% sulfur compared to 6,86% introgen and 31.39% sulfur calculated for $C_{16}H_{28}N_2O_2S_4$.

EXAMPLE 3

Bis(cis- and trans-2,3-dichloroallyl) [ethylenebis(oxytrimethylene)]bis(dithiocarbamate) as a viscous amber oil in 75% yield. Analysis gave 22.45% sulfur compared to 23.47% calculated for $C_{16}H_{24}Cl_4O_2S_4$.

The dithiocarbamates of this invention are useful as fungicides, particularly as foliage fungicides, and the following is illustrative of their activity.

Quadruplet cucumber plants (14 to 21 days old) having the first leaf the size of a half-dollar, were sprayed to "run-off" with an aqueous emulsion containing 1250 p.p.m. of the test compound at a rate of 10 ml. per 45 seconds using 10 pounds air pressure while rotating the plants on a turntable in a spray chamber. For control purposes one leaf of each plant was covered with a plastic shield prior to spraying. After spraying to "run-off" the spray deposit was permitted to dry and the treated and untreated leaves of the plants were sprayed with a spore suspension containing 30,000 to 40,000 conical spores of *Collectrotrichum lagenarium* (the causal agent of cucumber anthracnose) per ml. The inoculated plants were immediately placed in a moist chamber at 70° F. After 36 hours the plants were removed to the greenhouse. Disease incidence was recorded 3 to 5 days after incubation. The lesions on the first leaf of each of the four cucumber plants in each pot were recorded and the percent disease, based on the inoculated, untreated controls, was calculated. The incidence of disease was rated as follows:

E=No infection
P=Slight infection
F=Moderate infection
N=Infection similar to controls The results are recorded below:

TABLE I

| Toxicant: | Fungicide rating |
|---|---|
| Diallyl[ethylenebis(oxytrimethylene)]bis(dithiocarbamate) | E |
| Bis(cis- and trans-2,3-dichloroallyl)[ethylenebis(oxytrimethylene)]bis(dithiocarbamate) | P |
| Bis(2-chloroallyl)[ethylenebis(oxytrimethylene)]bis(dithiocarbamate) | P |

In similar tests bis(2-cyclohexenyl)[ethylenebis(oxytrimethylene)]bis(dithiocarbamate) was ineffective.

Bis(2 - chloroallyl)[ethylenebis(oxytrimethylene)]bis(dithiocarbamate) has the property of controlling soil borne pathogenic organisms which attack the underground parts of plants. Activity was demonstrated against "damping-off" fungi. Those present were principally Pythium, Rhizoctonia, and Fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots, and 15 seeds each of two crop plants sown in each pot. The crop plants were Delta Pine No. 15 cotton and Straight Eight cucumbers. The seeded pots were then incubated at 70° F. at 98% humidity to insure activity of the organisms in the soil. Twenty-four hours later the pots were removed to a greenhouse and disease assessments made within 10–14 days. The percent emergence and disease incidence were recorded. The ratings were based on inoculated, untreated, and uninoculated sterile soil treatments. For convenience in recording the data, the following rating scale was used.

| Rating: | Disease incidence (healthy plants out of 30) |
|---|---|
| E | 26–30 |
| P | 19–25 |
| F | 13–18 |
| N, not effective | <13 |

Due to the enormous amount of material which it must protect, a soil fungicide must be effective at very low concentrations in order to be economically feasible. In soil containing 30, 15, and 5 parts per million, respectively, of bis(2-chloroallyl)[ethylenebis(oxytrimethylene)]bis(dithiocarbamate), there were 19 to 25 healthy plants out of the 30 plants (P rating). Soil fungicidal activity at 5 p.p.m. is several orders of magnitude below the minimum concentration at which bis(2-cyclohexenyl)[ethylenebis(oxytrimethylene)]bis(dithiocarbamate) described in my Patent No. 3,082,237 is effective.

It is intended to cover all changes and modifications of the examples of the invention herein chosen for purposes of disclosure which do not constitute departures from the spirit and scope of the invention. The matter contained in the following claim is to be read as part of the general description of the present invention.

What is claimed is:
1. A compound of the formula

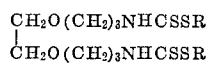

where R is 2-chloroallyl.

References Cited

UNITED STATES PATENTS

| | | | |
|---|---|---|---|
| 2,997,382 | 8/1961 | Harman et al. | 260—455 |
| 3,082,237 | 3/1963 | D'Amico | 260—455 |
| 3,096,236 | 7/1963 | D'Amico | 260—455 |
| 3,152,163 | 10/1964 | Zerbe et al. | 424—300 |
| 2,974,082 | 3/1961 | Collins | 424—300 |

FOREIGN PATENTS

| | | | |
|---|---|---|---|
| 1,310,953 | 10/1962 | France | 260—455 |

LEWIS GOTTS, Primary Examiner

G. HOLLRAH, Assistant Examiner

U.S. Cl. X.R.

424—300